C. B. GILLESPIE.
MEANS FOR EXCLUDING FLIES FROM BUILDINGS.
APPLICATION FILED JULY 30, 1913.
1,095,499.
Patented May 5, 1914.
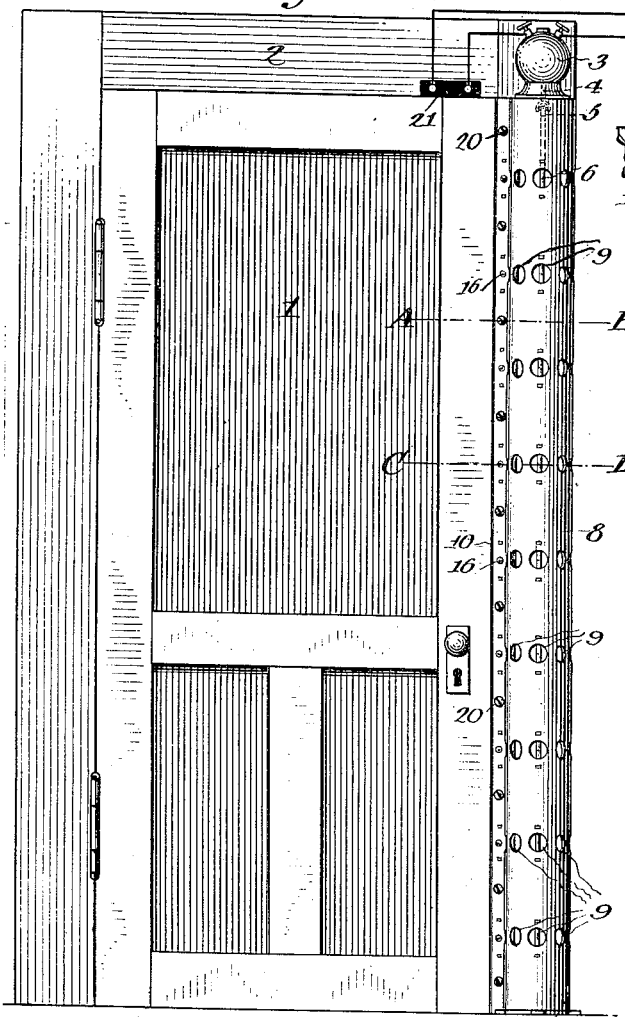
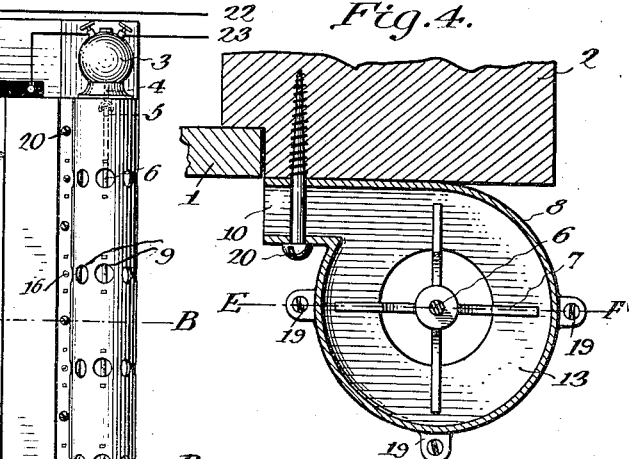
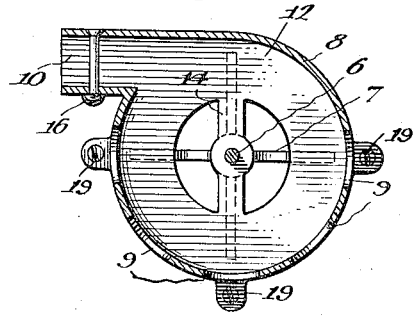
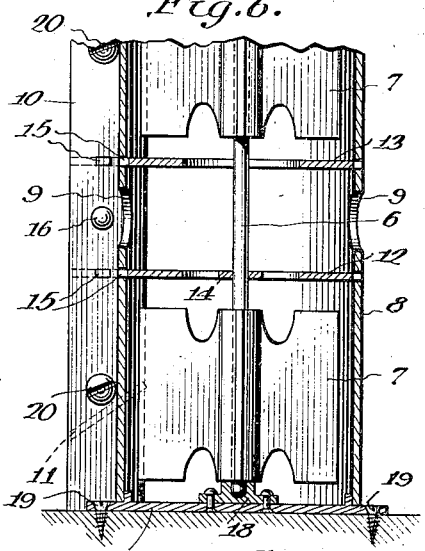
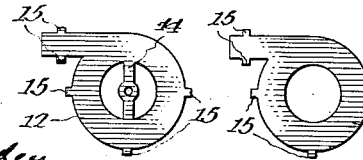
Witnesses:
M. E. Smoot
James E. Alden
Inventor:
Charles B. Gillespie
by his attorney

UNITED STATES PATENT OFFICE.

CHARLES B. GILLESPIE, OF GRAND FORKS, NORTH DAKOTA.

MEANS FOR EXCLUDING FLIES FROM BUILDINGS.

1,095,499.  Specification of Letters Patent.  Patented May 5, 1914.

Application filed July 30, 1913.  Serial No. 782,067.

*To all whom it may concern:*

Be it known that I, CHARLES B. GILLESPIE, a citizen of the United States of America, and a resident of Grand Forks, in the State of North Dakota, have invented a new and useful Improvement in Means for Excluding Flies from Buildings, of which the following is a specification.

This invention relates to means for excluding flies from stores, bakeries, restaurants, meat markets or packing houses, slaughter houses, and the like; and especially to their exclusion from entrance doorways which are the most difficult to effectively guard.

In a previous specification forming part of United States Letters Patent No. 1,053,983, dated February 25, 1913, I set forth a fly-proof entrance booth or vestibule provided with a downwardly blowing overhead electric fan, the motor of which is controlled by means carried in part by the outer door of the vestibule or booth.

In many places it is impracticable to construct such a booth for want of available space; and, owing to its distance from the floor, an overhead fan must be very powerful to be effective. This means the use of a large amount of electricity, and heavy running expenses.

The present invention consists in fly-excluding means characterized by a door-controlled blower having an outlet passage directed laterally toward the doorway, and adapted for use at ordinary entrance doorways, without any booth or vestibule; and, more particularly, in certain novel combinations of parts, hereinafter described and claimed.

The leading objects of this invention are to render a fly-excluding blower effective without such booths or vestibules, and to so locate and equip a suitable blower that it will start from a dead stop and exclude flies from the instant it starts.

Other objects are to so construct the blower that it will produce an even velocity of air blast all along the free edge of the door, and will direct the same from within the building positively outward through the entrance and across the doorway where the distance is shortest.

Further objects will be set forth in the general description, which follows.

A sheet of drawings accompanies this specification as part thereof.

Figure 1 is an inside elevation of an entrance doorway provided with fly-excluding means according to the present invention; Figs. 2 and 3 are plan views, with the door frame in section, illustrating the operation of the device; Figs. 4, 5 and 6 are sectional views on a larger scale, Fig. 4 being a horizontal section on the line A—B, Fig. 1, Fig. 5 a like section on the line C—D Fig. 1, and Fig. 6 a vertical section on the line E—F, Fig. 4; Figs. 7 and 8 are plan views of partition members detached.

Like reference characters refer to like parts in all the figures.

An inwardly swinging entrance door and its frame are represented respectively at 1 and 2; an electric motor at 3; its vertical shaft at 4; a universal joint at 5, Fig. 1; a downwardly extending vertical fan shaft at 6; a series of fans fast on said fan shaft at 7; and a sheet-metal casing, common to said fans, at 8; said fan shaft, fans and casing forming in a preferred way what is herein sometimes termed the "blower" of the improved fly excluding device. Said casing 8 is constructed with air inlets, 9, for the several fans; and a continuous outlet, 10, common to all, which is provided with a deflector, 11 Fig. 6, shown in dotted lines, to insure that the air shall blow across the doorway in sweeping contact with the floor. The casing is provided with transverse partitions, 12, and 13, located respectively above and below the several fans; the former being constructed with supplemental bearings, 14 Fig. 8, for the fan shaft 6; and these partitions have edge projections, 15 Figs. 8 and 9, fitted to holes in the body of the casing, as means for supporting them. Compare Fig. 6. The body of the casing and said partitions, 12, 13, are united, after assembling them around and between the fans 7, by rivets or bolts 16 (Fig. 5). A bottom member, 17, is provided with a step, 18 Fig. 6, for the fan shaft 6; and the casing, as a whole is attached to the floor by wood-screws, 19, passing through lugs of said bottom member; and to the inner surface of the adjacent door post of the frame 2 by wood-screws 20; the outlet 10 being located in close proximity to the edge corresponding with and adjoining the free edge of the door 1, and forming an outlet passage for the fly-excluding air-blast directed laterally toward the doorway.

An automatic electric switch, 21, is arranged to be operated by mechanical contact with the door 1, and is constructed to close an electric circuit through the motor 3 when the door is opened, in a known way; ordinary electric connections for this purpose being represented at 22, 23, Fig. 1. The motor and therewith the fans may thus be and are started before the free edge of the door 1 clears the frame 2, so as to deliver a powerful blast of air across the outer surface of the door and in sweeping contact therewith as soon as a crack is opened, as represented by Fig. 3, and across the doorway so long as the door is open. The sudden puff of wind when the door moves surprises and blows away the flies that may be resting on the door or on the door sill. The multiplicity of fans located adjacent to the free edge of the closed door insures the direction of the breeze therefrom positively outward, and so as to cross the doorway opening where the distance is shortest. An even velocity of wind is also thus produced all along the free edge of the door.

As compared with my said patented fly excluding entrance, vestibule or booth, the present device is adapted to be fitted to any door, and to be operated with material economy of electricity.

The universal joint represented at 5 serves to compensate for any lack of alinement of the fan shaft 6 with the motor shaft 4, and may obviously be of known or improved construction.

The location of the blower within the building precludes blowing flies from without through the entrance; and the casing serves not only to direct the fly-excluding air blast, but renders the device safe by preventing accidental contact with the revolving wings of its fans. The electric motor 3 and switch 21 may also be of known or improved makes, and their construction, together with that of the universal joint 5, forms no part of the present invention.

The air inlets 9 may obviously be made in the form of slots or of ornamental shapes; and other like modifications will suggest themselves to those skilled in the art.

Having thus described said improvement, I claim as my invention, and desire to patent under this specification.

1. Improved means for excluding flies from a building, comprising, in combination with a swinging entrance door and a motor separate therefrom, a blower driven by said motor, supported within the building adjacent to the doorway, and having an outlet passage directed laterally toward the doorway and adapted to direct the wind from said blower across the doorway and in sweeping contact with the door.

2. Improved means for excluding flies from a building, comprising, in combination with an inwardly swinging entrance door and its frame, a normally quiescent motor separate from said door, means for starting said motor before said door leaves its frame, means for transmitting motion from said motor to a blower, and a blower thus driven supported within the building adjacent to the doorway, and having an outlet passage directed laterally toward the doorway at the free edge of said door and adapted to direct the wind from said blower across the doorway and in sweeping contact with the outer surface of the door.

3. A fly-excluding device for an entrance doorway having, in combination with a swinging door a suitable motor, a vertical fan-shaft rotatable by said motor, a multiplicity of fans carried by said shaft, and a casing common to said fans having air inlets for the several fans and a continuous outlet common to all said fans, said outlet being adjacent to and directed laterally toward said doorway.

4. A fly-excluding device for an entrance doorway having, in combination with a swinging door a suitable motor at the top of said door, a vertical fan-shaft extending downward from and rotatable by said motor, a multiplicity of fans carried by said shaft, and a casing common to said fans having air inlets for the several fans and a continuous outlet common to all said fans located adjacent to and directed laterally toward said doorway; said casing being provided with a bottom member attachable to the floor, and a step for said shaft supported by said bottom member.

5. A fly-excluding device for an entrance doorway having, in combination with a swinging door, a door-controlled motor, a vertical fan-shaft rotatable by said motor, a multiplicity of fans carried by said shaft, and a casing common to said fans having air inlets for the several fans and a continuous outlet common to all said fans located adjacent to and directed laterally toward said doorway; said casing being provided with transverse partitions above and below the several fans, some of them forming bearings for said fan shaft.

6. A fly-excluding device for an entrance doorway having, in combination with a swinging door, a door-controlled motor, a vertical motor shaft, a universal joint, a vertical fan shaft coupled to said motor shaft by said joint and extending downwardly therefrom, a multiplicity of fans fast on said fan shaft, and a wind-directing casing having a bottom member provided with a step for said fan shaft, an outlet passage common to said fans adjacent to and directed laterally toward said doorway, and a deflector within said passage arranged to direct some of the air blown across said doorway into sweeping contact with the floor.

7. The combination with an inwardly swinging entrance door and its frame of a series of laterally blowing fans, a wind-directing casing therefor, having an outlet passage directed toward the doorway and means by which said casing is attached to the inner surface of the door post adjacent to the free edge of the door and to the floor.

8. The combination with an inwardly swinging entrance door and its frame of a series of laterally blowing fans, means for directing the wind therefrom against the free edge of the door as it opens and in sweeping contact with its outer surface, a motor therefor, and means for controlling said motor by the movements of said door, substantially as hereinbefore specified.

CHARLES B. GILLESPIE.

Witnesses:
P. McLaughlin,
J. N. Dagg.